US012695494B2

(12) United States Patent
Ibrahim et al.

(10) Patent No.: US 12,695,494 B2
(45) Date of Patent: Jul. 28, 2026

(54) LEVERAGING CSI TEMPORAL CORRELATION FOR EFFICIENT BEAM DOMAIN CSI COMPRESSION

(71) Applicant: InterDigital Patent Holdings, Inc., Wilmington, DE (US)

(72) Inventors: Mohamed Salah Ibrahim, Chesterbrook, PA (US); Patrick Tooher, Montreal (CA); Mihaela Beluri, Jericho, NY (US); Yugeswar Deenoo Narayanan Thangaraj, Chalfont, PA (US); Akshay Malhotra, San Jose, CA (US)

(73) Assignee: InterDigital Patent Holdings, Inc.

( * ) Notice: Subject to any disclaimer, the term of this patent is extended or adjusted under 35 U.S.C. 154(b) by 72 days.

(21) Appl. No.: 18/787,558

(22) Filed: Jul. 29, 2024

(65) Prior Publication Data

US 2026/0031883 A1      Jan. 29, 2026

(51) Int. Cl.
*H04B 7/06* (2006.01)

(52) U.S. Cl.
CPC ....... *H04B 7/06952* (2023.05); *H04B 7/0626* (2013.01)

(58) Field of Classification Search
CPC ... H04B 7/04; H04B 7/06; H04B 7/08; H04B 7/024; H04B 7/0456; H04B 7/0626;
(Continued)

(56) References Cited

U.S. PATENT DOCUMENTS

2022/0247477 A1* 8/2022 Ryu .................... H04B 7/06952
2024/0223254 A1* 7/2024 Hindy .................... H04B 7/063
2025/0240140 A1* 7/2025 Kumar .................. H04L 5/0048

FOREIGN PATENT DOCUMENTS

AU      2017397007 A1     8/2019
WO      2023035174 A1     3/2023
WO      2023192575 A1     10/2023

OTHER PUBLICATIONS

R1-2404054, "Discussion on AI/ML-based CSI compression", 3GPP TSG-RAN WG1 #117, Fukuoka City, Fukuoka, Japan, May 20-24, 2024, 17 pages.

(Continued)

*Primary Examiner* — Shawkat M Ali
(74) *Attorney, Agent, or Firm* — Flaster Greenberg, P.C.

(57) ABSTRACT

A WTRU may receive configuration information for channel state information (CSI) feedback and a first CSI reference signal (CSI-RS) transmission. The processor is configured to determine a first subset of beams associated with the first CSI-RS transmission and a second subset of beams associated with the first CSI-RS transmission. The first subset of beams is associated with: a longer validity time than a validity time of the second subset of beams, a lower beam range than a beam range of the second subset of beams, and/or a smaller difference between beam indices associated with consecutive beam domain reporting instances than a difference between beam indices associated with the second subset of beams. The processor may send one or more reports that include an indication of the first and second subset of beams and first and second parameters associated with the first and second subset of beams, respectively.

20 Claims, 9 Drawing Sheets

(58) Field of Classification Search
CPC ..................... H04B 7/06952; H04B 17/318; H
04B 17/391; H04L 1/1812; H04L 5/00;
H04L 12/24; H04W 16/28; H04W 24/10;
H04W 72/04; H04W 72/25; H04W 74/08
USPC ................ 375/219, 260, 262, 267, 295, 316
See application file for complete search history.

(56) References Cited

OTHER PUBLICATIONS

Salah, et al., "Low Complexity Beam Domain Processing for Autoencoder Based CSI Compression", 2024 IEEE 13rd Sensor Array and Multichannel Signal Processing Workshop (SAM), IEEE, Jul. 8, 2024, 5 pages.
3GPP TS 38.211 V17.3.0 , "NR; Physical Channels and Modulation (Release 17)", 3rd Generation Partnership Project; Technical Specification Group Radio Access Network, Sep. 2022, 136 pages.
3GPP TS 38.212 V17.3.0 , "NR; Multiplexing and Channel Coding (Release 17)", 3rd Generation Partnership Project; Technical Specification Group Radio Access Network, Sep. 2022, 201 pages.
3GPP TS 38.213 V17.3.0 , "NR; Physical Layer Procedures for Control (Release 17)", 3rd Generation Partnership Project; Technical Specification Group Radio Access Network, Sep. 2022, 260 pages.
3GPP TS 38.214 V17.3.0 , "NR; Physical Layer Procedures for Data (Release 17)", 3rd Generation Partnership Project; Technical Specification Group Radio Access Network, Sep. 2022, 232 pages.
3GPP TS 38.321 V17.2.0 , "NR; Medium Access Control (MAC) Protocol Specification (Release 17)", 3rd Generation Partnership Project Technical Specification Group Radio Access Network, Sep. 2022, 246 pages.
3GPP TS 38.331 V17.2.0 , "NR; Radio Resource Control (RRC) Protocol Specification (Release 17)", 3rd Generation Partnership Project; Technical Specification Group Radio Access Network, Sep. 2022, 1298 pages.

* cited by examiner

LEVERAGING CSI TEMPORAL CORRELATION FOR EFFICIENT BEAM DOMAIN CSI COMPRESSION

BACKGROUND

Channel State Information (CSI) feedback report consists of multiple components and may be reported in multiple parts. A key component in the feedback information is the precoding matrix index (PMI) which may be referred to as a codeword index in the codebook, and dominates the overhead associated with the feedback report. A codebook includes a set of precoding vectors/matrices for each rank and the number of antenna ports, and each precoding vectors/matrices has its own index so that a receiver may inform preferred precoding vector/matrix index to a transmitter. The codebook-based precoding may have performance degradation due to its finite number of precoding vector/matrix as compared with non-codebook-based precoding. However, a major advantage of a codebook-based precoding could be lower control signaling/feedback overhead.

SUMMARY

An example Wireless Transmit/Receive Unit (WTRU) is disclosed that includes a processor. The processor is configured to receive configuration information for channel state information (CSI) feedback. The processor is further configured to receive a first CSI reference signal (CSI-RS) transmission. The processor is further configured to determine a first subset of beams associated with the first CSI-RS transmission and a second subset of beams associated with the first CSI-RS transmission. The first subset of beams is associated with at least one of: (i) a longer validity time than a validity time of the second subset of beams, (ii) a lower beam range than a beam range of the second subset of beams, or (iii) a smaller difference between beam indices associated with consecutive beam domain reporting instances than a difference between beam indices associated with the second subset of beams. The processor is further configured to send one or more reports. The one or more reports comprise an indication of the first subset of beams, first parameters associated with the first subset of beams, an indication of the second subset of beams, and second parameters associated with the second subset of beams.

In examples, the configuration information comprises one or more of an indication of a number of beam subsets, an indication of a minimum number of beams per subset, an indication of a maximum number of beams per subset, or an indication of a default number of beams per subset. In examples, the configuration information comprises one or more of an indication of an initial validity time associated with each beam subset, an indication of a minimum validity time associated with each beam subset, or an indication of a maximum validity time associated with each beam subset. In examples, the configuration information comprises one or more of an indication of a beam range threshold or an indication of a differential beam step threshold. In examples, the configuration information comprises an indication of a beam subset reporting format. In examples, the one or more reports are sent periodically. In examples, reports that comprise information associated with the first parameters associated with the first subset of beams are sent using a lower number of reporting instances than a number of reporting instances used to send reports that comprise information associated with the second subset of beams. In examples, reports that comprise information associated with the first subset of beams are sent in response to a determination that transmission performance associated is less than a threshold. In examples, reports that comprise information associated with the first subset of beams are sent in response to a determination that transmission performance associated is less than a threshold. In examples, the first parameters comprise one or more of an indication of a number of beams selected for the first subset of beams, a validity time determined for the first subset of beams, a differential beam step size selected for the first subset of beams, a differential beam step size selected for the first subset of beams, or a beam range selected for the first subset of beams.

An example method performed by a Wireless Transmit/Receive Unit (WTRU) is disclosed. The method involves receiving configuration information for channel state information (CSI) feedback. The method also involves receiving a first CSI reference signal (CSI-RS) transmission. The method also involves determining a first subset of beams associated with the first CSI-RS transmission and a second subset of beams associated with the first CSI-RS transmission. The first subset of beams is associated with at least one of: (i) a longer validity time than a validity time of the second subset of beams, (ii) a lower beam range than a beam range of the second subset of beams, or (iii) a smaller difference between beam indices associated with consecutive beam domain reporting instances than a difference between beam indices associated with the second subset of beams. The method also involves sending one or more reports. The one or more reports comprise an indication of the first subset of beams, first parameters associated with the first subset of beams, an indication of the second subset of beams, and second parameters associated with the second subset of beams.

In examples, the configuration information comprises one or more of an indication of a number of beam subsets, an indication of a minimum number of beams per subset, an indication of a maximum number of beams per subset, or an indication of a default number of beams per subset. In examples, the configuration information comprises one or more of an indication of an initial validity time associated with each beam subset, an indication of a minimum validity time associated with each beam subset, or an indication of a maximum validity time associated with each beam subset. In examples, the configuration information comprises one or more of an indication of a beam range threshold or an indication of a differential beam step threshold. In examples, the configuration information comprises an indication of a beam subset reporting format. In examples, the one or more reports are sent periodically. In examples, reports that comprise information associated with the first parameters associated with the first subset of beams are sent using a lower number of reporting instances than a number of reporting instances used to send reports that comprise information associated with the second subset of beams. In examples, reports that comprise information associated with the first subset of beams are sent in response to a determination that transmission performance associated is less than a threshold. In examples, the first parameters comprise one or more of an indication of a number of beams selected for the first subset of beams, a validity time determined for the first subset of beams, a differential beam step size selected for the first subset of beams, a differential beam step size selected for the first subset of beams, or a beam range selected for the first subset of beams. In examples, the method also involves pre-processing channel state information (CSI) associated with the first CSI-RS transmission using the determined first subset of beams and the determined second subset of beams; and determining, based on the pre-processed CSI, CSI compression for a beam domain auto encoder (BDAE). In examples, the one or more reports comprise an indication of a compressed CSI for the first CSI-RS transmission based on the BDAE.

DETAILED DESCRIPTION

Figure 1A:
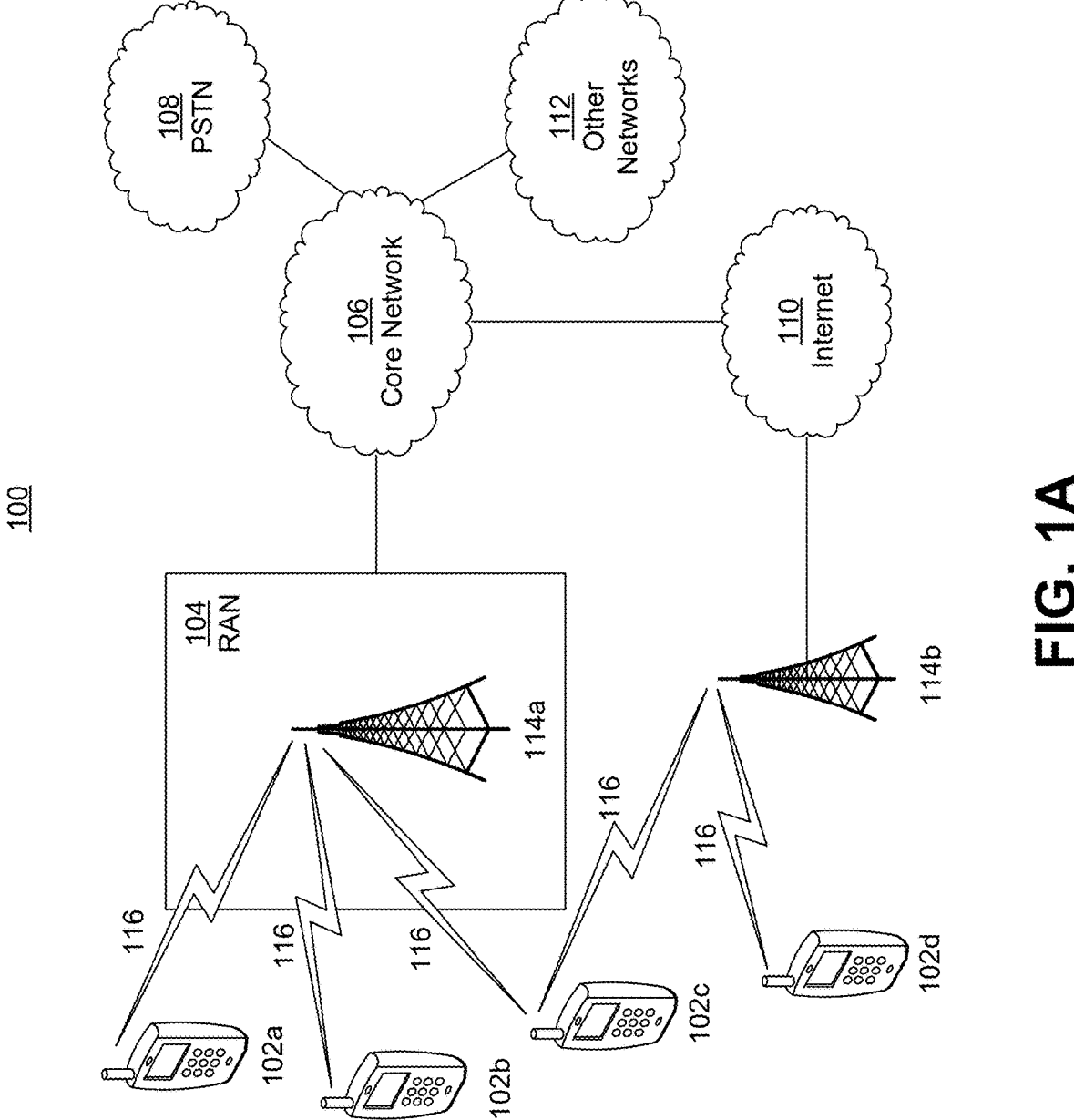
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IOT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a WTRU.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VOIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
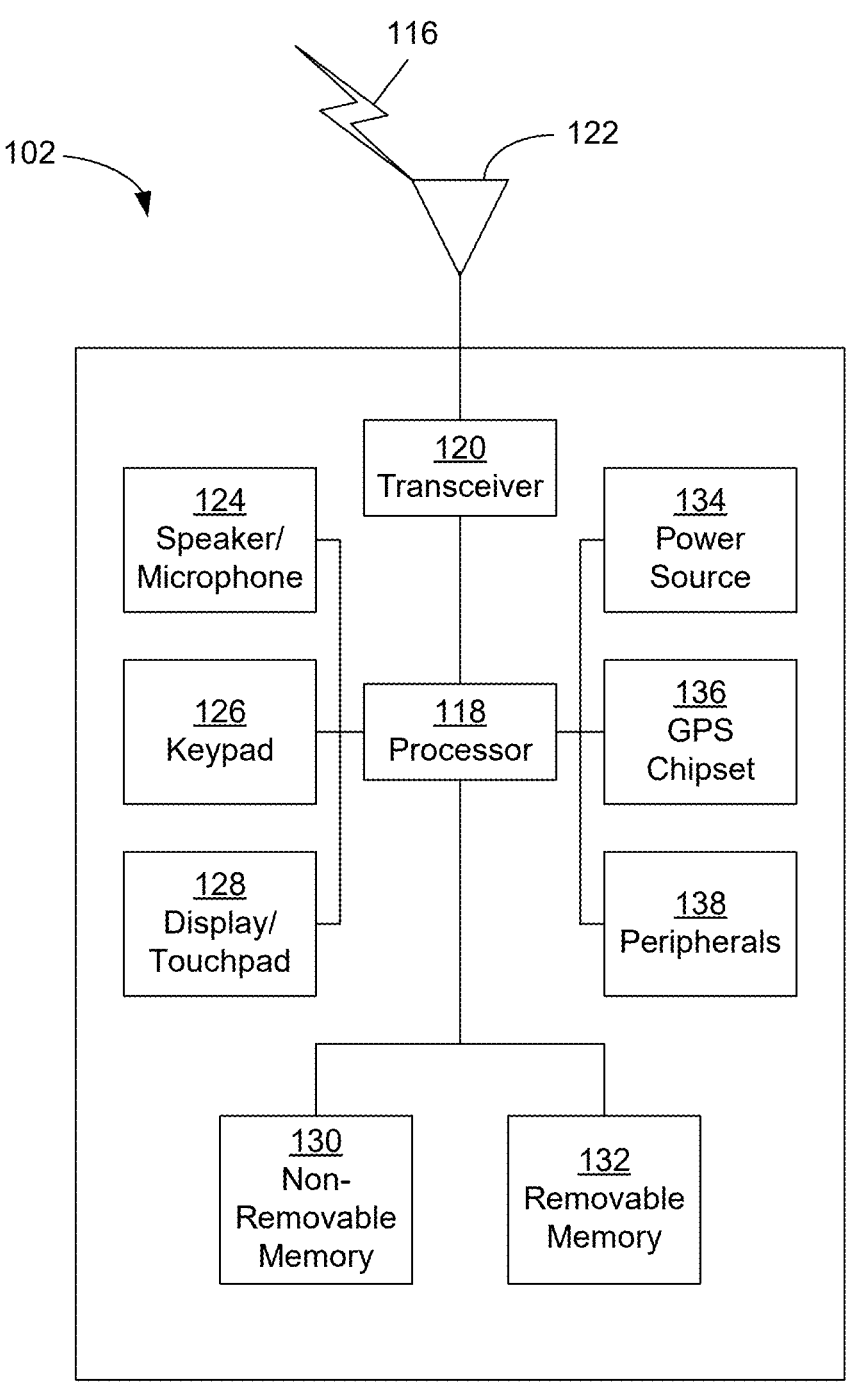
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
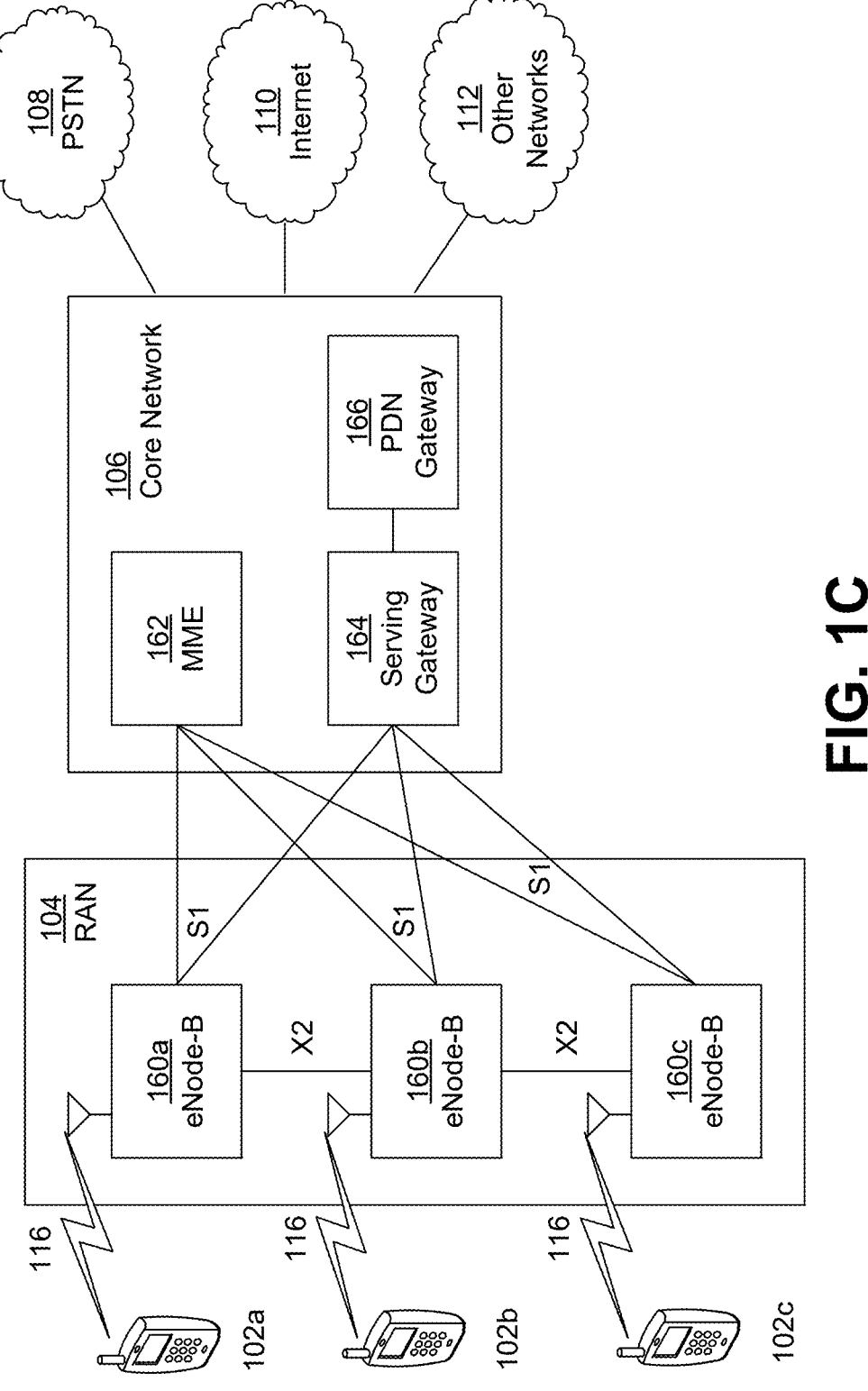
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHZ, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHZ, 10 MHz and 20 MHz bandwidths in the TV White Space (TVWS) spectrum, and 802.11ah supports 1 MHz, 2 MHZ, 4 MHZ, 8 MHZ, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHZ mode, even if the AP, and other STAs in the BSS support 2 MHz, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
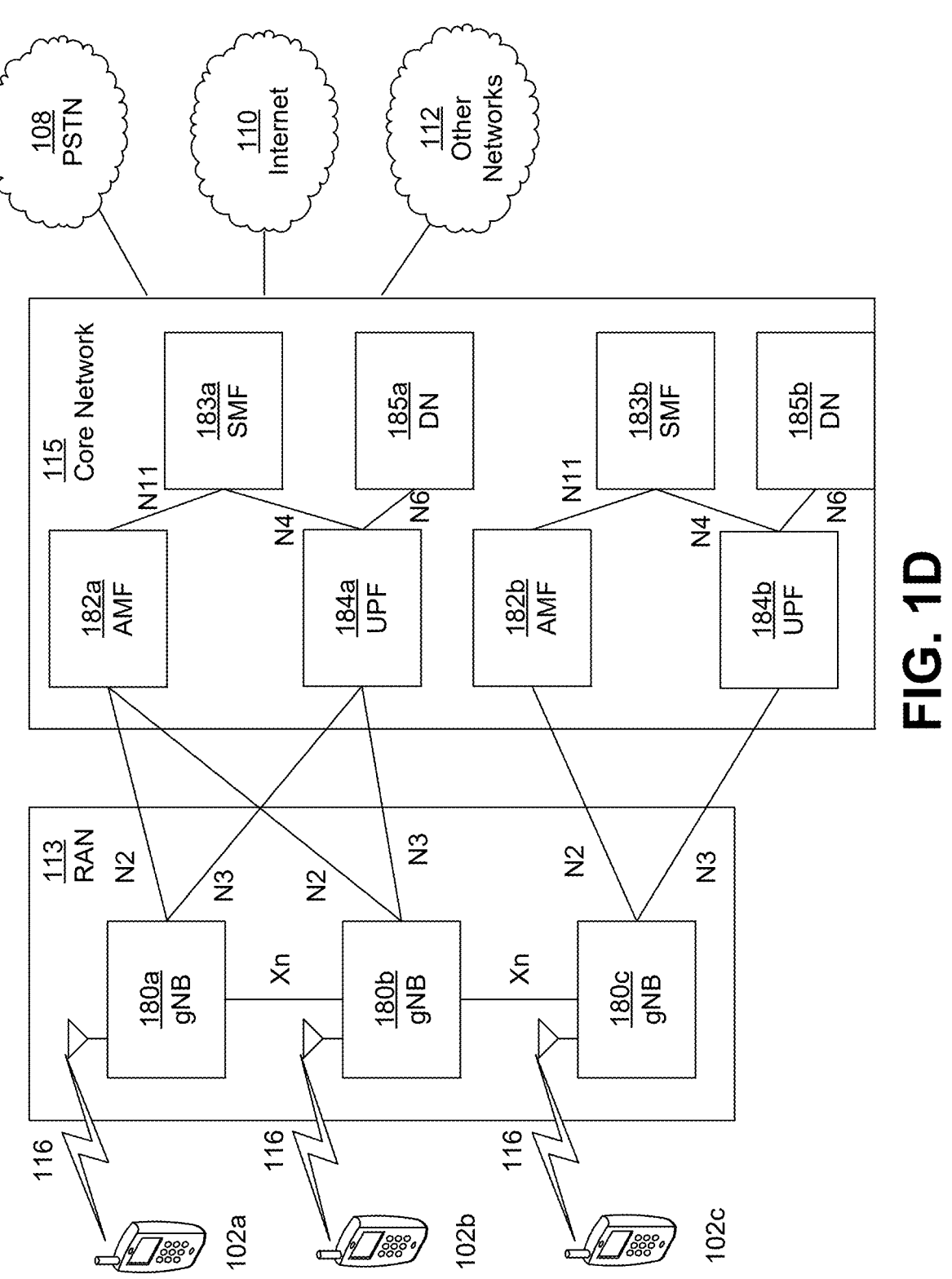
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating WTRU IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a*-*d*, Base Station 114*a*-*b*, eNode-B 160*a*-*c*, MME 162, SGW 164, PGW 166, gNB 180*a*-*c*, AMF 182*a*-*ab*, UPF 184*a*-*b*, SMF 183*a*-*b*, DN 185*a*-*b*, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Figure 2:
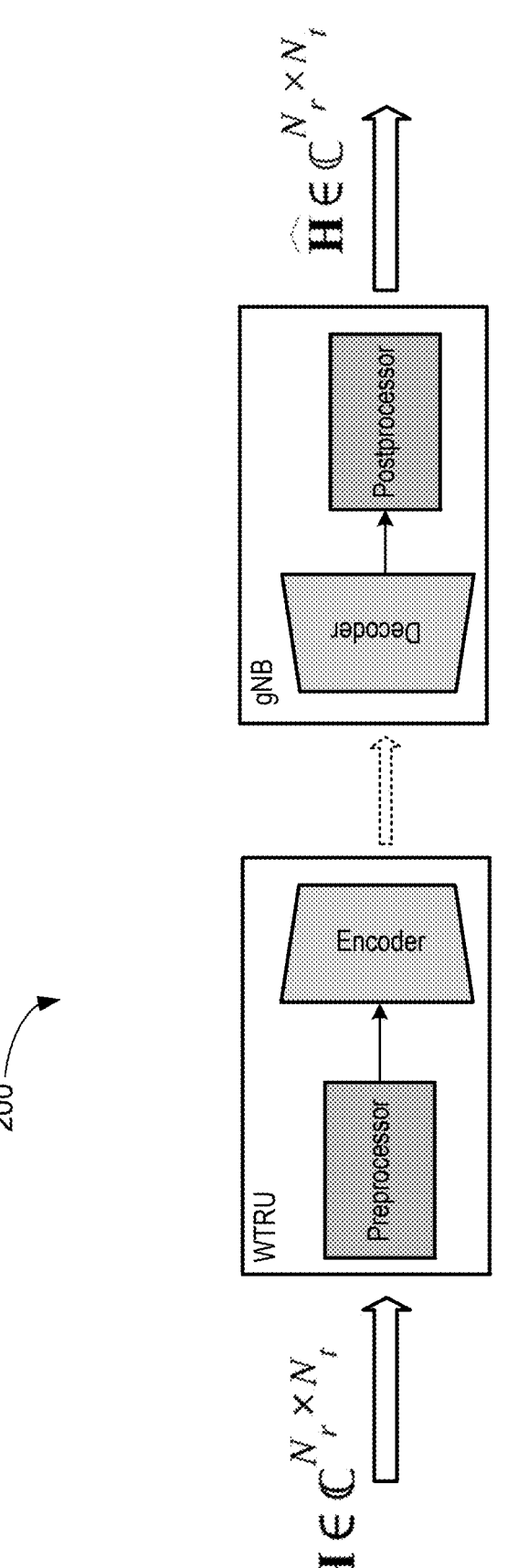
FIG. 2 is a block diagram illustrating an example artificial intelligence/machine learning (AI/ML) framework for channel state information (CSI) compression.

FIG. 2 is a block diagram illustrating an example artificial intelligence/machine learning (AI/ML) framework 200 for channel state information (CSI) compression. Auto-encoders (AE) are a specific class of deep neural networks (DNNs) that arise in context of un-supervised machine learning setting wherein the high-dimensional data is non-linearly transformed to a lower dimensional latent vector using the DNN based encoder and the lower dimensional latent vector is then used to re-produce the high-dimensional data using a non-linear decoder. The encoder is represented as $E(x; W_e)$ where x is the high-dimensional input data and $W_e$ represents the parameters of the encoder. The decoder is represented as $D(z; W_d)$ where z is the low-dimensional latent representation and $W_d$ represents the parameters of the decoder. The trained encoder $E(x; W_e)$ can be used to compress the high-dimensional data and trained decoder $D(z; W_d)$ can be used to decompress the latent representation. The AI/ML framework for CSI compression using AE consists of pre/post-processor and AI/ML encoder/decoder at the WTRU and gNB, respectively, as shown in FIG. 2. The input channel $H \in \mathbb{C}^{N_r \times N_t}$ is first preprocessed and/or transformed to another domain before being compressed by the AI/ML encoder. The received compressed channel is then de-compressed by the AI/ML decoder and then post-processed to be transformed back to the original domain associated with the input channel H.

Figure 3:
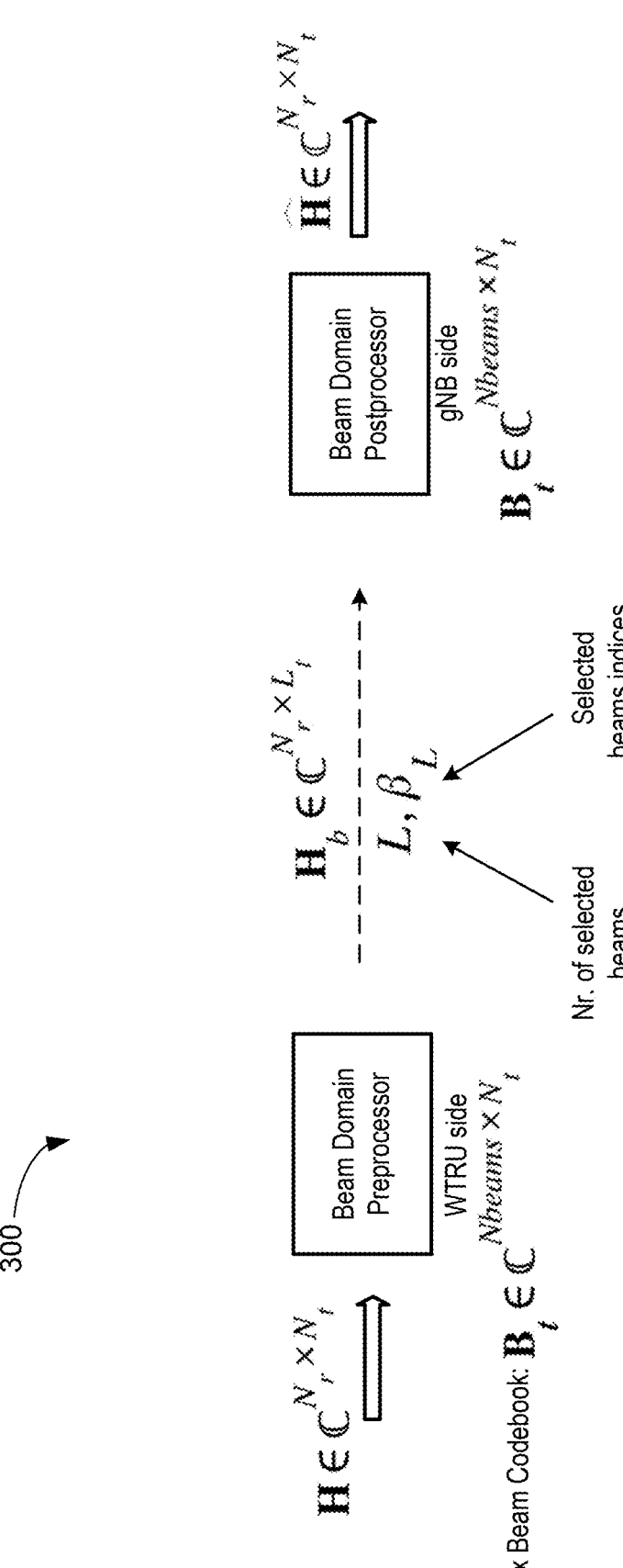
FIG. 3 is a block diagram illustrating an example beam domain pre and post processor.

FIG. 3 is a block diagram 300 illustrating an example beam domain pre and post processor. Beam domain preprocessing is an efficient linear transformation of the channel response matrix from the antenna domain $H \in \mathbb{C}^{N_r \times N_t}$, to the beam domain channel $H_b \in \mathbb{C}^{N_r \times L_t}$, as shown in FIG. 3. The transformation using beam domain preprocessor (BDP) requires selecting a set of beams ($L_t$) from a transmit (Tx) codebook ($B_t \in \mathbb{C}^{N_{beams} \times N_t}$) that is known at both communication sides, where $L_t$ is smaller than the number of transmit antennas. The size of the channel response matrix represented in beam domain is smaller than the original size of the channel response (in the antenna domain), i.e., $L_t \ll N_t$. This results in a reduction in the AE complexity and memory requirements. The pre-processed channel response is applied at the input of the AE (input of the AI/ML encoder) to be compressed and sent back to the Rx side for decompression and post-processing.

Beam domain autoencoder (BDAE) offers a more efficient compression process, e.g., in terms of memory and computational requirements relative to the standalone spatial-domain AE. However, beam domain processing may be more beneficial in scenarios where the number of selected beams needed to achieve a target reconstruction performance is small, i.e., to reduce the associated overhead resulting from signaling the beam indices. This limits the applicability of BDAE to handle a wide variety of communication scenarios, e.g., non-line-of-sight (NLOS). One way to reduce the overhead associated with the beam domain approach is to leverage the channel correlation properties in the temporal domain. The beams selected by BDP are expected to change less frequently over time, and thus same set of beams may be used across multiple reporting instances. This relaxes the constraint of selecting small number of beams, and hence, enables more efficient beam domain framework and increases the applicability of the BDAE.

In some scenarios, solutions are needed to enable more efficient BDAE framework with adaptive overhead including variable long-term BDP reporting in addition to fixed short-term reporting associated with the compressed beam-frequency samples using the BDAE. Accordingly, the present disclosure provides solutions that enable addressing at least the following problems: determining different subsets of selected beams, such as a first subset of beams (e.g., static) and a second subset of beams (e.g., dynamic); determining the parameters associated with each subset of beams (e.g., validity time associated with each subset of beams; and/or monitoring the subsets of selected beams (e.g., triggers to update the different subsets of beams).

Examples described herein include WTRU procedures for determination and reporting of beam subsets and associated parameters for beam domain CSI compression. Examples described herein further include methods for efficient beam domain CSI compression with leveraging CSI temporal correlations such as, for example, determining and reporting a first subset of beams (e.g., static) and a second subset of beams (e.g., dynamic) along with their associated parameters. Example parameters may include a validity time and/or size of each subset. The parameters may be determined as a function of one or more channel measurements (e.g., angle-of-arrival (AoA), angle-of-departure (AoD), etc.) and/or may be based on a correlation metric.

A WTRU may receive configuration information for CSI feedback based on beam domain CSI compression, e.g., using an AE model. The configuration information may include an indication of beam domain configuration parameters. Example beam domain configuration parameters include a number of beam subsets; a minimum, maximum, and/or default number of selected beams for each subset; an initial, default, maximum, and/or minimum beam validity time for each subset, a beam range threshold; and/or a differential beam step threshold. The beam validity time may indicate how long a same selected set of beams for each subset may be used for beam domain processing and/or transformation. The beam range threshold may define the difference between a maximum and minimum beam index for each subset across time (e.g., number of CSI reports). The differential beam step threshold may define a maximum allowed change of beam index for differential reporting of beam indices.

The configuration information may include criteria and/or conditions for WTRU-based beam subset determination and/or beam-subset-parameter determination. The criteria and/or conditions may include a correlation metric (e.g., square generalized correlation similarity (SGCS) between consecutive samples), a speed threshold, and/or a BDP performance threshold.

The configuration information may include a reporting configuration, such as uplink (UL) resources for reporting beam domain parameters, a periodicity for reporting beam domain parameters, UL resources for reporting compressed beam domain, a periodicity for reporting compressed beam domain (e.g., using AE, CSI reporting, etc.), and/or a beam subset reporting format (e.g., differential or absolute).

A WTRU may receive a first channel state information reference signal (CSI-RS) transmission and a second CSI-RS transmission. The WTRU may estimate and/or store the CSI and/or associated channel parameters, (e.g., AoAs, AoDs) associated with each CSI-RS transmission. In an example, the WTRU determines or selects one or more beams associated with the first CSI-RS transmission for beam domain processing based on one or more of: allocated UL overhead, a configured BDP performance threshold, a configured number of selected set of beams, etc.

The WTRU may be configured to determine (e.g., and store) a first subset of beams and a second subset of beams based on determined beams and parameters associated with each subset (e.g., number of beams, validity time, differential beam step size, beam range). The parameters may be associated with a first CSI-RS transmission, e.g., based on rate of change of channel parameters. Additionally or alternatively, parameters determined for the first CSI-RS transmission may include one or more parameters determined based on a rate of change of a metric (e.g., AoAs and/or AoDs) between the first CSI-RS transmission and a second CSI-RS transmission, a measured validity time associated with each beam, and/or a measured WTRU speed.

The first subset of beams and the second subset of beams may be associated with different validity times, different beam ranges, and/or different offsets between beam indices associated with consecutive beam reporting instances. In an example, the first subset of beams may have one or more of the following properties: 1) the first subset of beams may be static, for instance, the first subset of beams may have a longer validity time than a validity time of the second subset of beams (e.g., and/or may have a validity time that is greater than a configured validity time threshold); 2) a beam range associated with the first subset of beams may be smaller than a configured threshold (e.g., and/or may be smaller than a beam range associated with the second subset of beams); and/or 3) a difference between beam indices over consecutive beam domain reporting instances may be smaller than a configured differential beam step threshold (e.g., and/or may be smaller than a difference between beam indices associated with the second subset of beams).

The second subset of beams may have one or more of the following properties: 1) the second subset of beams may be dynamic (e.g., reported and/or updated more frequently relative to the first subset of beams) and/or may have a validity time that is less than a configured validity time threshold; 2) a beam range associated with the second subset of beams may be greater than a configured threshold; 3) the difference between beam indices over consecutive beam domain reporting instances of the second subset of beams may be greater than a configured differential beam step threshold; and/or 4) the indices of beams in the second subset may not overlap with the first subset. Thus, in an example, the WTRU may be configured to send information associated with first parameters associated with the first subset of beams using a lower number of reporting instances than a number of reporting instances used to send reports that comprise information associated with the second subset of beams.

A WTRU may be configured to report the determined subsets of beams and associated parameters (e.g., number of beams per subset), a validity time for each subset, a differential beam step size for each subset, and/or beam range for each subset. The WTRU may be configured to perform the reporting periodically (e.g., every N reporting instances, where N is configured or recommended by the WTRU). Additionally or alternatively, the WTRU may be configured to perform the reporting in response to a performance-based event or condition (e.g., if performance drops below a threshold), and/or in response to a beam update event (e.g., if it is determined that one or more subset of beams is to be updated).

Thus, for example, the WTRU may be configured to send one or more reports. The one or more reports may comprise an indication of the first subset of beams, first parameters associated with the first subset of beams, an indication of the second subset of beams, and/or second parameters associated with the second subset of beams. Furthermore, in line with the discussion above, the first parameters may comprise one or more of an indication of a number of beams selected for the first subset of beams, a validity time determined for the first subset of beams, a differential beam step size selected for the first subset of beams, a differential beam step size selected for the first subset of beams, or a beam range selected for the first subset of beams.

The WTRU may be configured to pre-process CSI associated with a CSI-RS transmission using the determined first and second subset of beams and to perform CSI compression using the configured beam domain AE. In an example, the WTRU may report the beam domain compressed channel.

Within examples, proposed solutions are described herein to provide an efficient beam domain compression framework that leverages CSI temporal correlation to reduce the overhead associated with the beam domain processing. In addition to the memory and computational gains achieved by the BDP implementations described in the present disclosure, the solutions described herein also provide performance and overhead gains as compared to existing similar methods. For example, a WTRU may be configured to pre-process CSI associated with a first CSI-RS transmission using the determined first subset of beams and the determined second subset of beams, and to determine (based on the pre-processed CSI) CSI compression for beam domain AE (BDAE). Furthermore, the WTRU may be configured to send one or more reports comprising an indication of a compressed CSI for the first CSI-RS transmission based on the BDAE.

The terms Artificial Intelligence (AI), Machine Learning (ML), Deep Learning (DL), DNNs may be used interchangeably throughout the present disclosure. Methods described herein are exemplified with respect to learning in wireless communication systems. However, it is noted that the methods described herein are not limited to such applications. In general, it should be understood that the systems and services described in the present disclosure may be applicable to any type of transmissions, communication systems, and/or services, etc. Throughout the present disclosure, the terms AE model, AI/ML model, ML model, AI model may be interchangeably used to refer to the model used for CSI compression. Hereafter, the term beam domain pre-processing (BDP) may be interchangeably used with pre-processing matrix, transform matrix, transforming input dimension, transforming input to virtual antennas, antenna virtualization, and physical to beam conversion. The term codebook or BDP codebook may be interchangeably used to refer to the codebook containing the set of configured beams that may be used for selection of beams required for domain transformation. The terms BDAE, beam domain model, beam domain AI/ML model, beam domain ML model may be used interchangeably to refer to the model used for CSI compression assuming beam domain samples as input.

Example benefits of the proposed solutions for utilizing CSI temporal correlation for efficient beam domain compression described in the present disclosure include reducing the signaling overhead associated with the BDP when CSI temporal correlation is used, thereby resulting in a lower overhead compared to other methods (e.g., BDP without using temporal correlations and spatial-domain AE). Example benefits of the systems and methods described herein also include improving the reconstruction performance of BDAE, avoiding or reducing the need for model selection/switching by allowing one beam domain model to support variable input size (e.g., different number of antennas) and/or by providing a BDAE model that is agnostic to the number of antennas. Example benefits of the systems and methods described herein also include reducing AE complexity by reducing the dimensionality of different BDAE layers (e.g., input, output, bottleneck), for example, since number of beams may be lower than the number of antennas, which in turn reduces the WTRU complexity (e.g., processing time) as a light-weight BDAE can be used relative to implementations with no BDP.

Examples for configuration of a beam domain processor are described herein. A WTRU capable of performing beam domain pre-processing (BDP) for CSI compression may be configured to receive configuration information for determining and reporting parameters for beam domain CSI compression. The configuration information may include beam domain parameters, metrics for beam subset determination, criteria for beam subset determination, and/or a reporting configuration for the determined beam subset(s). In an example, the WTRU may be configured semi-statically, for example, via radio resource control (RRC) configuration.

Example configurations for beam domain parameters are described herein. The WTRU may be configured to determine or may be configured with the number of beams, $L_t$, to use for beam domain pre-processing, where $L_t$ is smaller than the number of transmit antennas or the number of Tx antenna ports. The WTRU may receive configuration information for the number of transmit antennas (e.g., or the number of Tx antenna ports), and for the maximum reconstruction error, for example when the WTRU is configured to determine the number of beams $L_t$.

Some of the determined $L_t$ beams may change more frequently than other beams due to the temporal properties of the channel. The WTRU may group beams (e.g., beam indices) with similar temporal properties in the same beam subset, for example, to reduce signaling overhead for the determined beams. For example, a first subset may comprise beam indices that change more seldomly, and a second subset may comprise beam indices that change more frequently.

The WTRU may be configured to receive a configuration to determine the beam subsets. The configuration may include a number of beam subsets. The configuration may include a minimum, maximum and/or default number of beams in each subset. In one solution, the minimum, maximum and default number of beams may be the same for all subsets. In some solutions, the number of beam (e.g., and/or the minimum, maximum or default number of beams) indicated in the configuration may be specific to each subset. For example, a first subset (e.g., corresponding to beam indices that change slowly with time) may be configured to have a larger maximum number of beams; and a second subset (e.g., corresponding to beam indices that change frequently with time) may be configured to have a smaller maximum number of beams (e.g., to reduce beam reporting overhead).

The configuration may include beam validity time (e.g., initial, minimum, and/or maximum) for each subset, where the validity time indicates how long the determined beams (e.g., beam indices) of the subset may be used for beam domain processing. In one solution, the WTRU may use the beam validity time as a time-based trigger for beam subset parameter updates. For example, the WTRU may initialize a validity timer (e.g., or a validity counter) when it first determines the beam subset parameters. When the validity timer expires (e.g., or when the validity counter reaches the set threshold), the WTRU may perform measurements to determine the updated beam subsets. In some examples, the WTRU may initialize the subset validity time to the configured initial value and may use statistical measurements for each beam subset to update the beam subset validity time. For example, when the WTRU determines that there is a high rate of change of the beam indices in a beam subset, the WTRU may reduce that subset's validity time, up to the configured minimum validity time. When the WTRU determines that there is a low rate of change of the beam indices in a beam subset (e.g., when the time between beam index changes is larger than the current subset validity time), the WTRU may increase that subset's validity time, up to the configured maximum validity time.

The configuration may include a beam range threshold, where the beam range threshold represents the difference between the maximum and the minimum beam index of a subset across time. In one solution, the WTRU may use the beam range threshold to determine the beam subsets, for example, where a first beam subset may have a beam range smaller than the configured beam range threshold, and a second beam subset may have a beam range larger than the configured beam range threshold.

The configuration may include a differential beam step threshold, for example, where a beam step represents the difference between the determined beam indices over consecutive beam parameter reporting instances, and the differential beam step threshold defines a maximum allowed change of beam index (e.g., maximum beam step) for differential reporting of the beam index. In one solution, when the beam step for the determined beam(s) in the subset exceeds the configured differential beam step threshold, the WTRU may be configured to request a grant to transmit the absolute beam indices (e.g., instead of differential reporting of beam indices).

Example configurations of metrics and criteria for beam subset and beam subset parameter determination are described herein. The WTRU may be configured with metrics and/or associated criteria for beam subset determination. In an example, the configuration for the metrics and criteria may include an Angle of Arrival (AoA) and/or AoA threshold. For instance, when AoA is the configured metric for beam subset determination, the WTRU may be configured to measure the AoA of the determined beams, and use the configured AoA threshold to assign each beam to a beam subset. In an example, the configuration may include a correlation metric (e.g., correlation similarity (CS), Generalized CS (GCS) or squared generalized CS (SGCS)) and/or a correlation threshold. For instance, when correlation is configured as a metric, the WTRU may measure a correlation between consecutive CSI samples, for example, to update the validity time. In one solution, the WTRU may compare a measured correlation (e.g., SGCS) between two consecutive CSI samples, and compare the measured correlation to a configured correlation threshold. If the measured correlation is smaller than the configured threshold, then the WTRU may be configured to reduce the validity time of a corresponding beam subset. In an example, the configuration may include a BDP performance threshold, which represents a CSI reconstruction error (e.g., normalized mean square error (NMSE) or SGCS) for determining or updating the selected beams.

Example configurations for reporting beam subset and/or beam subset parameters are described herein. A WTRU may be configured to receive a configuration for reporting the determined beam subset and/or beam subset parameters. In an example, the configuration may include a beam subset reporting format, which may be absolute (e.g., the index of each beam in the beam subset is reported) or differential (e.g., the WTRU reports the beam step for each determined beam such as the difference between the determined beam indices over consecutive beam parameter reporting instances). In an example, the configuration may include a type of reporting for a beam subset and/or beam subset parameters, for example, periodic, semi-persistent, or aperiodic. In an example, the configuration may include an indication of UL resources for reporting a beam subset and/or beam subset parameters.

Example triggers for beam subset parameter updates are described herein. A WTRU may be triggered to determine parameters of beam domain preprocessing (BDP) (e.g., beam domain configuration parameters such as the number of beam subsets). A WTRU may be triggered to determine parameters for one or more of the beam subsets. A WTRU may be triggered to determine a beam associated with one or more of the beam subsets.

The triggers to obtain BDP parameters or beam subset parameters or beams associated with one or more beam subsets may include time. For example, a WTRU may be configured with time instances at which the WTRU is to determine parameters of one or more beam subsets. For example, the WTRU may be configured with periodic time instances (e.g., defined by period and time offset) for when to determine parameters of one or more beam subsets. The WTRU may be configured to determine a period and/or time offset for determining parameters of one or more beam subsets as a function of the validity time of the one or more beam subsets. The WTRU may be configured to indicate a WTRU-determined period and time offset to the gNB.

The triggers may include reception of a reference signal (RS). For example, the WTRU may be configured with RSs (e.g., CSI-RS) to use for the determination of beams or parameters associated with a beam subset. The WTRU may determine parameters of beams associated with a beam subset upon reception of the RS. In an example, the WTRU may determine parameters associated with one or more beam subsets as a function of reception of two or more RSs. For example, the WTRU may determine validity time of a beam subset as a function of rate of change of a measurement performed on the two or more RSs.

The triggers may include time of feedback report. For example, when the WTRU reports feedback using BDP, the WTRU may be triggered to determine new parameters or beams of one or more beam subsets.

The triggers may include reconfiguration of RS. For example, the WTRU may be triggered to determine parameters or beams associated with one or more subsets or associated with BDP, in response to the WTRU receiving a new RS (e.g., CSI-RS) configuration.

The triggers may include a trigger received from a gNB. For example, a WTRU may receive an indication from the gNB to determine parameters or beams associated with one or more subsets. The indication may be received, for example, via downlink control information (DCI), medium access control (MAC) control element (CE), and/or RRC.

The triggers may include a performance assessment of BDP. For example, the WTRU may determine the performance for one or more beam subsets. The performance may include an absolute BDP error (e.g., the BDP error compared to no pre-processing) or a relative BDP error (e.g., the difference in performance between using an existing or valid beam subset compared to using an optimal beam subset—where, for example, an optimal beam subset may be defined as one with the smallest absolute BDP error). The WTRU may compare the performance to a threshold (e.g., configurable threshold). If the performance is worse compared to the threshold (e.g., the error is greater than the threshold) for one or more beam subsets, the WTRU may be triggered to determine new parameters or beams associated with the one or more beam subsets. In an example, the BDP error may be defined as an error in CSI reporting.

The triggers may include time since last determination of a parameter or beam associated with a beam subset. For example, the WTRU may be triggered to determine new parameters or beams associated with a beam subset if the time since a previous determination is greater than the validity time. The time may be measured in milliseconds (ms), slots, subframes, symbols and/or the like.

The triggers may include transmission performance. For example, the WTRU may be triggered to determine new BDP parameters, new parameters associated with a beam subset, and/or beams associated with a beam subset based on transmission (e.g., DL transmission or sidelink (SL) transmission) performance. For example, a WTRU may be configured with hybrid automatic repeat request-negative acknowledgement (HARQ-NACK) thresholds. For example, if the rate of HARQ-NACK is greater than a threshold, then the WTRU may be triggered to determine new BDP parameters, or new parameters or beams associated with a beam subset, for example. More generally, in an example, reports that comprise information associated with the first subset of beams are sent in response to a determination (e.g., by the WTRU) that transmission performance is less than (or greater than) a threshold.

The trigger may include a number of times that a feedback report was based on one or more beam subsets deemed not optimal. For example, in some cases a WTRU may report feedback using one or more sub-optimal beam subsets (e.g., subsets that may not minimize BDP error, but whose error may be acceptable). The WTRU may count the number of feedback report that was based on one or more sub-optimal beam subsets, if the count is greater than a configurable number, the WTRU may be triggered to determine new BDP parameters or new parameters or beams associated with a beam subset. The count may be reset to 0 after a period of time elapses. The period of time may be started when a count goes from 0 to 1. The period of time may be restarted whenever the WTRU reports feedback using one or more sub-optimal beam subsets.

Note that the determination of new BDP parameters, or parameters or beams associated with one or more beam subsets, may lead to maintaining the same BDP parameters, or the same parameters or beams associated with one or more beam subsets. In such a case, even though the parameters or beams have not changed, we may consider the parameters or beams as new parameters or beams in the above description of triggers.

In some examples, a trigger may be biased towards one or more beam subsets rather than another beam subsets. For example, the triggers may be biased such that a WTRU keeps parameters or beams of a first beam subset constant while determining new parameters or beams for a second beam subset. For example, triggers based on performance may have thresholds configured or determined by the WTRU such that the WTRU is less likely to determine new parameters or beams of a first beam subset rather than determining new parameters or beams of a second beam subset.

An aforementioned trigger may be applicable if the WTRU does not have a valid set of beams for one or more beam subsets. For example, a WTRU may be triggered to determine a first or second beam subset (e.g., or parameters thereof) based on reception of a request for CSI using BDP if (e.g., only if) a WTRU does not have a valid, or previously determined, first or second beam subsets (e.g., or parameters thereof).

An aforementioned trigger may be applicable if (e.g., applicable only if) the WTRU has a valid set of beams for one or more beam subsets. For example, a WTRU may be triggered to determine a first or second beam subset (or parameters thereof) based on HARQ-ACK performance if (e.g., only if) the WTRU has valid, or previously determined first or second beam subsets.

An aforementioned trigger may not be applicable if the WTRU does not have a previously determined or valid set of beams for one or more beam subsets.

An aforementioned trigger may not be applicable if the WTRU has a previously determined or valid set of beams for one or more beam subsets.

Performance of BDP may be assessed based on gNB request. Performance of BDP may be assessed periodically (e.g., with a period and time offset). Performance of BDP may be assessed based on when CSI using BDP is reported by the WTRU. Performance of BDP may be assessed based on reception of RS (e.g., RS configured for BDP performance tracking, or RS configured for CSI reporting using BDP). Performance of BDP may be assessed based on timing of feedback report. For example, a WTRU may assess the performance of BDP whenever it has a feedback report using BDP.

Performance of BDP may be determined based on measurements performed on an RS compared to measurements performed on a previously received RS (e.g., an RS used to determine the currently used parameters or beams associated with one or more beam subsets).

The triggers described herein may also be used by the UE to determine when to report BDP parameters or beams associated with one or more beam subsets. The WTRU may report the full set of parameters or beams associated with one or more beam subsets. The WTRU may report if the parameters or beams associated with one or more beam subsets have not changed since a previous report (e.g., without reporting the parameters or beams themselves).

Examples for determination of beam indices and beam domain transformation are described herein. In an example, a WTRU may be configured to select specific sets of beams for beam domain transformation. The WTRU may thus leverage a codebook of potential beams or beam domain vectors and identify based on different approaches the set of beams to be utilized for beam domain transformation.

In a solution, the WTRU may utilize a codebook which may either be configured by the gNB or maybe self-determined by the WTRU for selecting the beam domain vectors. In one example, the codebook may be the DFT codebook consisting of vectors from the DFT matrix. In another example an oversampled version of the DFT codebook could be used with larger number of beams with a smaller angular granularity and thus more options for beam selection, but at the cost of beams not being orthogonal to each other anymore. In some examples, array response vectors associated with the transmit/receive antenna arrays may be used to form a codebook. In some examples, codebooks learnt from the data using different ML methods like data clustering can also be utilized to provide a codebook of higher efficiency.

The WTRU may select the beams in a greedy manner, a method referred to as greedy beam selection and is outlined below (e.g., in steps 1 to 5). Given the input channel matrix H, of dimensions, $K \times N_r \times N_t$, where K is the number of configured sub-bands in the channel and $N_r$ and $N_t$ are the number of receive and transmit antennas, respectively, the channel is averaged across the K sub-bands. Further, for this method, an objective for the WTRU is to select $N_b$ beams from the codebook C.

Step 1: A first step involves estimating the channel correlation/covariance matrix $V=HH^*$, where '*' denotes the conjugate transposition operator. The matrix V is a $N_r \times N_r$ matrix which will allow for the selection of the receive side beams.

Step 2: Next a 2D projection of the V matrix is performed on the codebook matrix and is described as: $Proj=CVC'$.

Step 3: Select the beam corresponding to the largest diagonal entry and remove the projection of the channel on the selected beam $$H_{remaining} = H - C_r\left[L^r_{sel}, :\right]^* C_r\left[L^r_{sel}, :\right] H,$$

where $$L^r_{sel}$$

denotes the selected beam indices.

Step 4: Repeat steps (1) to (3) to find the next best beam and continue till My beams are selected.

Step 5: Steps (1) to (4) may further be repeated to find the transmit side beams $$\left(L^t_{sel}\right)$$

by utilizing the channel correlation/covariance matrix V2=H*H. The matrix V2 is a $N_t \times N_t$ matrix which will allow for the selection of the $M_t$ transmit side beam, where H* is the transpose of H.

Examples for transformation to and from beam domain are described herein. Once the receive side and transmit side beams have been selected, the WTRU may be configured to evaluate the beam domain channel by projecting the $K \times N_r \times N_t$ channel onto the selected beams, according to the following equation:

$$H_b = C_r\left[L^r_{sel}, :\right] H C_t\left[L^t_{sel}, :\right]^*$$

where $H_b$ has dimensions $K \times M_t \times M_r$.

Similarly, at the WTRU, the received and decompressed beam domain matrix is pre-multiplied with $$C_r\left[L^t_{sel}, :\right]^*$$

and post multiplied with $$C_t\left[L^t_{sel}, :\right]$$

to get the antenna domain channel.

Example tradeoffs between reconstruction error and the number of bits used for beam feedback are described herein. The WTRU may select the number of beams for BDP and the associated AI model. If the number of beams is increased, the error associated with the BDP reduces but the overhead associated with indicating the beams increases. Additionally, higher processing may be employed to compress the beam domain channel and feedback overhead associated with the AI model and the reconstruction error associated with the model may be larger.

The WTRU may determine the number of beams to be selected based on a pre-defined threshold on the reconstruction error associated with beam domain pre-processing.

The WTRU may select the number of beams based upon the WTRU speed or its position or the direction in which the WTRU is moving/heading. The WTRU may estimate the future time instances, for which the set of selected beams may be optimal at decorrelating the channel data. If the beams remain optimal for large periods of time, the WTRU may be configured to utilize a larger number of beams for beam domain processing and have a larger single time feedback associated with reporting the beams. Further, if the beams are optimal at decorrelating the channel data, the WTRU may be configured to reduce the feedback size of the autoencoder based compression.

In a solution, the WTRU may select the beams based on the rank of the overall channel matrix. The number of beams may thus be proportional to the channel rank.

Examples for evaluating impacts of beam ordering on autoencoder and for overcoming the impacts with zero padding are described herein. As part of the beam selection process, a WTRU may be configured to use different sets of beams for different channel samples. In some scenarios, since a channel is projected onto these beams before sending the beam domain channel for autoencoder based compression, the data in the beam domain channel across different channels may not correlate well, as the autoencoder may not have any prior information as to which element in the beam domain channel corresponds to which beam. This can result in poor training and inference performance of the auto encoder. To overcome this problem, in one solution, the WTRU may create a beam domain channel which of size $|C_r| \times |C_t|$, where $|C_r|$ and $|C_t|$ are the cardinalities of the codebook set. Thus, while transforming the channel matrix H to the beam domain, the beam domain matrix HE has non-zero entries in (e.g., only in) the positions corresponding to the selected beams $$L^r_{sel}, L^t_{sel}.$$

The remaining entries may continue to be zero. This advantageously enables the WTRU to preserve the selected beam location and enables improved training of the autoencoder.

Examples for determination of beam domain subsets and associated parameters are described herein. A WTRU may be configured to determine one or more beam subsets based on the determined/selected beams associated with the estimated CSI. A first beam subset may include a first set of beam indices while a second beam subset may include a second set of beam indices wherein the two beam subsets are disjoint, e.g., the beam indices in the first and second beam subsets are distinct. The different beam subsets may have different properties. The first beam subset may be static wherein it has a longer validity time relative to a second subset, or a validity time that is greater than a preconfigured threshold. Moreover, the first beam subset may be associated with a beam range wherein the difference between the maximum beam index and minimum beam index is below a configured threshold. The first beam subset may have a beam step smaller than a configured beam step threshold, wherein the beam step represents the differences between selected beam indices over consecutive beam domain reporting instances. The second beam subset may be dynamic wherein it has a shorter validity time relative to a second subset, and a validity time that is smaller than a preconfigured threshold. The second beam subset may be associated with a beam range wherein the difference between the maximum beam index and minimum beam index is above a configured threshold. The second beam subset may have a beam step higher than a configured beam step threshold, wherein the beam step represents the differences between selected beam indices over consecutive beam domain reporting instances. In a solution, the first subset may be encoded and transmitted using a lower MCS while the second subset may be encoded and transmitted using a higher MCS.

Examples for associating the first subset of beams with the second subset of beams are described herein. In some examples, the WTRU may be configured to determine the second subset of beams as a function of the reported first subset of beams. For example, the second subset of beams may be determined under a constraint that the first subset of beams is to be used in the beam domain transformation for a configured period. For example, given a first subset of beams, the WTRU may determine a set of beams associated with the second subset that result in a target reconstruction performance. In a solution, the WTRU may determine the second subset as a complement of the first subset. For example, based on a determination of all the beam indices, the WTRU may first identify beams associated with the first subset and then select the remaining beams as the second subset of beams.

Examples for WTRU determination of candidate beams associated with each beam subset are described herein. In a solution, the WTRU may determine the beam subsets based on CSI measurements or associated parameters collected over a configured period and stored in a CSI buffer. The associated parameters may include angles of arrival (AoA) and/or angles of departure (AoD) and/or the beam indices associated with each CSI sample in the buffer. The WTRU may determine the beam indices associated with each beam subset based on one or more conditions.

The one or more conditions may include a rate of change of channel parameters (e.g., AoA matching or close to angle of a selected beam). For example, the WTRU may be configured to assign a selected beam to the first beam subset if the change in AoA corresponding to that beam, over a configured period, is below a configured threshold. Otherwise, the selected beam may be assigned to the second beam subset. In an example, the WTRU may be configured to measure the change in the AoA as a difference between a first AoA associated with a first sample in the CSI buffer and a last AoA associated with a last sample in the CSI buffer.

The one or more conditions may include beam frequency over a configured period. For example, the WTRU may be configured to assign a selected beam to the first subset of beams if a number of occurrences of the selected beam over a configured period (e.g., length of CSI buffer) exceeds a certain configured threshold. The threshold may be defined in different formats. For example, the threshold may be an integer number representing the number of occurrences needed for the beam to be assigned to the first subset of beams, or a percentage of a buffer length of the CSI buffer.

The one or more conditions may include beam type. For example, the WTRU may be configured to assign a selected beam to the first subset of beams if the selected beam represents a line-of-sight direction (e.g., if an angle of the beam is matched with the AoA associated with the line-of-sight (LOS) component).

The one or more conditions may include beam strength. For example, the WTRU may be configured to assign a selected beam to the first subset of beams if the selected beam preserves an amount of energy greater than a configured threshold. To obtain this, the WTRU may be configured to measure a normalized mean squared error (NMSE) between raw CSI and reconstructed CSI associated with the selected beam. If the resulting NMSE is below a configured threshold, then the WTRU may be configured to assign that beam to the first subset of beams. For example, this measurement may reflect the contribution of the selected beam to reconstructing a target CSI from a beam domain perspective.

Examples for WTRU determination of the parameters associated with each subset are described herein. Once the beams associated with each beam subset are determined, the WTRU may determine one or more parameters associated with each beam subset.

The one or more parameters may include a validity time associated with the beam subset. The validity time, for example, may define the time at which the beam subset is valid for beam transformation. In an example, the validity time may be measured in ms or number of CSI feedback reporting instances. In an example, the WTRU may determine the validity time associated with the beam subset as a function of the WTRU speed. In an example, the WTRU may determine the validity time as a function of a measured correlation between consecutive CSI samples. In an example, the WTRU may determine the validity time as a function of a measured beam frequency over a configured period.

The one or more parameters may include a beam range associated with the beam subset. In an example, the beam range may define a difference between a minimum beam index and a maximum beam index associated with the beam subset. The WTRU may determine the beam range based on collected beam indices over a period (e.g., number of consecutive CSI instances).

The one or more parameters may include a beam step associated with the beam subset. The beam step may define, for instance, a maximum difference between consecutive beam changes associated with the beam subset. The WTRU may adaptively determine the beam step associated with a beam subset based on collected beam indices associated with a beam subset over a configured period. For example, the WTRU may track the difference between consecutive beam indices over time.

Figure 4:
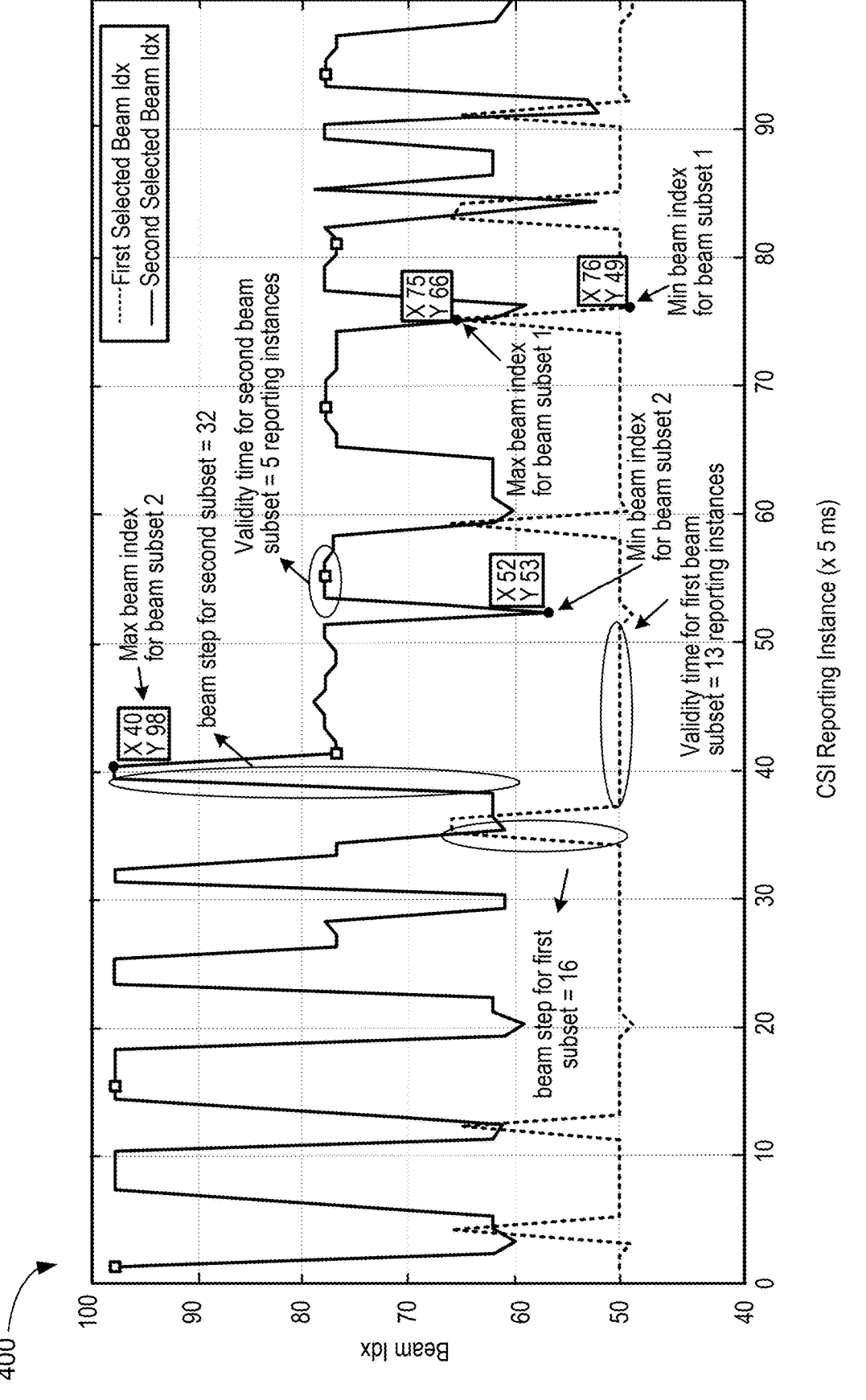
FIG. 4 is a graph that illustrates an example of beam domain processing with two beam subsets, where a first beam subset includes one beam and a second beam subset includes one beam.

FIG. 4 is a graph 400 that illustrates an example of beam domain processing with two beam subsets, where a first beam subset includes one beam and a second beam subset includes one beam.

Numerical examples for beam subset parameters are described herein. To illustrate how beam subsets and associated parameters are determined, a numerical example is shown in FIG. 4. Assuming two selected beams in every CSI reporting instance, the selected beam indices are shown on the y-axis (vertical axis) while the x-axis (horizontal axis) represents CSI reporting instances, with 5 ms periodicity. As illustrated, a first beam represented with dashed lines has longer validity time periods relative to a second beam represented with solid lines. For example, as shown, the validity time of the first beam may be 13 CSI reporting instances, while the second beam has a shorter validity time, e.g., validity time of 5 CSI reporting instances. In addition, the beam range for the first beam varies between 49 to 66 in a duration of 0.5 ms while the beam range for the second beam varies between 53 to 98 in 0.5 ms. The beam step for the first beam is 16 while the beam step for the second beam is 32. As such, the WTRU is configured to assign the first beam to the first beam subset and the second beam to the second beam subset.

Figure 5:
FIG. 5 is a graph that illustrates example reconstruction performance of a temporal-spatial-frequency (TSF) beam domain pre-processing (BDP) approach, a BDP spatial-frequency (SF) approach, and a standalone auto-encoder (AE) approach with spatial domain compression.

FIG. 5 is a graph 500 that illustrates example reconstruction performance of a TSF BDP approach, a BDP SF approach, and a standalone AE approach with spatial-frequency (SF) domain compression.

Numerical examples for the performance of BDP TSF and BDP SF are described herein. FIG. 5 shows the reconstruction performance of the TSF (BDP and AE) approach with long term reporting of the beam subsets against the SF (BDP and AE) with beam reporting every CSI feedback reporting instance and the spatial-frequency (SF) domain AE approach. As illustrated in FIG. 5, the proposed approach provides improvement in the reconstruction compared to the other two baselines.

Figure 6:
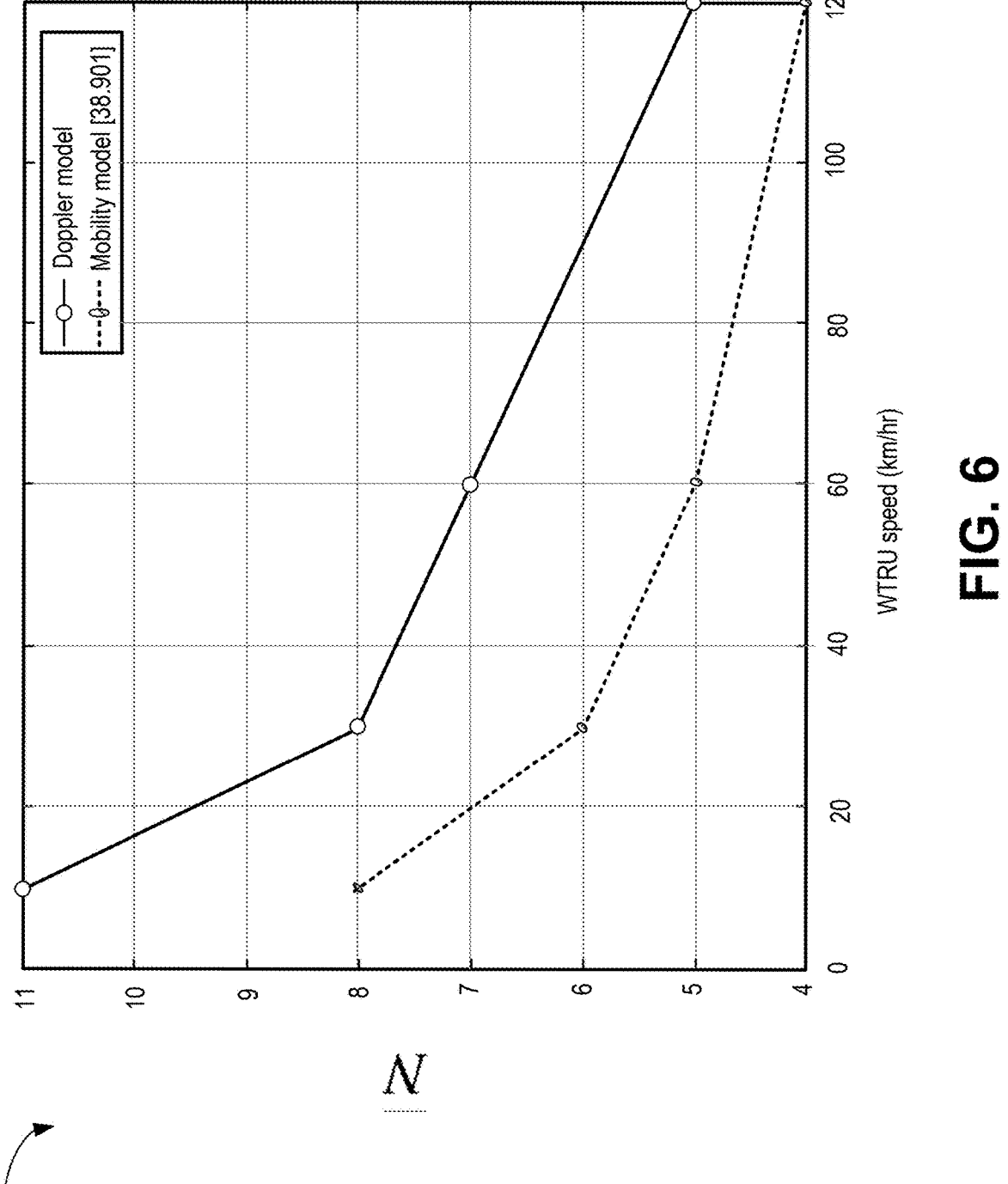
FIG. 6 is a graph that illustrates an example average validity time of beams versus WTRU speed for two channel models including a doppler model and a mobility model.

FIG. 6 is a graph 600 that illustrates an example average validity time of beams versus WTRU speed for two channel models including a doppler model and a mobility model. FIG. 6 shows the relation between the validity time and the WTRU speed. As illustrated in FIG. 6, the higher the WTRU speed the lower the number of consecutive CSI reporting instances will be without beam change. It may be argued that for moderate WTRU speeds, e.g., 10, 30, km/hr, the feedback associated with the BDP can be neglected when compared to the AE overhead. For instance, the results in FIG. 6 indicate that for the realistic mobility model with a speed of 30 km/hr, the average number of consecutive CSI reporting instances with the same selected beam is 6, and if each beam incurs an overhead of 7 bits (e.g., assuming 128 beams codebook) then with using the same beam over 6 consecutive CSI reporting instances the overhead is approximately 1 bit/beam on average.

From a complexity perspective, the number of floating point operations per second (FLOPs) and the number of trainable parameters associated with the beam-domain AE and the spatial-domain AE as a function of the number of selected beams, are shown in Table 1. It can be seen that the proposed framework TSF (AE+BDP) is more computationally and memory efficient relative to the standard spatial-domain AE approach. In particular, the number of FLOPs associated with the beam domain AE with two selected beams is more than an order of magnitude lower than the spatial-domain AE, and likewise for the number of trainable parameters.

TABLE 1

| Complexity performance associated with TSF (BOP + AE) and standalone AE | | |
|---|---|---|
| Method | Num. Beams $(L_t)$ | Num. Params $(\times 10^5)$ | FLOPs $(\times 10^6)$ |
| BDP + AE (proposed) | 1 | 2.35 | 1.89 |
| | 2 | 4.49 | 3.74 |
| | 3 | 6.62 | 5.59 |
| | 4 | 8.75 | 7.45 |
| | 5 | 10.88 | 9.30 |
| | 6 | 13.01 | 11.15 |
| AE(baseline) | — | 68.44 | 46.60 |

Example indications of beam domain parameters and compressed beam domain CSI are described herein. A WTRU may be configured to apply preprocessing to one or more inputs before compression. The preprocessing may involve operations in beam domain. Furthermore, such preprocessing may involve determination of a plurality of beam subsets. Such preprocessing may involve determination of one or more of the parameters of beam domain operation including number of beams, number of beam subsets, validity time for each subset, differential beam step size of each subset, beam range for each subset, differential beam step threshold etc.

The WTRU may be configured to report CSI (e.g., a CSI reporting instance) and report one or more beam subsets associated with the beam domain preprocessing for that CSI (one or more corresponding beam subset reporting instance (s)). In a solution, the WTRU may be configured with timing relationship between the CSI reporting instance and the corresponding beam subset reporting instance(s). In a solution, different timing relation may be configured between CSI reporting instance and different beam subset reporting instance(s). In a solution, the WTRU may be configured to report beam subsets upon preconfigured trigger conditions.

In a solution, out of the L beams selected for beam domain processing, the WTRU may be configured to group and/or indicate a first set of beams (e.g., L1) as a first subset and group/indicate a second set of beams (e.g., L2) as a second subset. For example, the beams in the first subset may be stable for a long period of time compared to beams in the second subset. For example, the number of beams in the first subset may be smaller than the number of beams in the second subset. For example, the WTRU may be configured to report first beam subset less frequently than the second beam subset. For example, the periodicity of the second beam subset reporting may be equal to periodicity of the CSI reporting. For example, the periodicity of the first beam subset reporting may be integer multiple of the CSI reporting. For example, the periodicity of the first beam subset reporting may be integer multiple of the second beam subset reporting. In a solution, the WTRU may be configured to report second beam subset along with CSI report. For example, the WTRU may report the second beam subset in part 1 of the CSI report and the compressed CSI in part 2 of the CSI report. In another solution, the WTRU may report different beam subsets in different parts of the CSI report. For example, the WTRU may report first beam subset in part 1 of CSI report and second beam subset in part 2 of the CSI report.

The WTRU may be configured to indicate the absolute beam indices in the beam subset reporting. For example, the WTRU may report absolute beam indices for both the first and second beam subset reporting. In some examples, the WTRU may be configured to indicate relative beam indices in the beam subset reporting. For example, the WTRU may indicate relative beam index in the form of delta from a preconfigured reference beam index or index set. For example, the WTRU may indicate relative beam index in the form of change in beam index from the previously reported beam subset. For example, the WTRU may indicate relative beam index for a second beam subset based on differences from beam index compared to first beam subset. The WTRU may apply relative beam index for both first and second beam subset reporting. The WTRU may apply absolute beam index for the first beam subset and relative beam index for a second beam subset reporting. The WTRU may be preconfigured with a first set of candidate beams for first beam subset and a second set of candidate beams for the second beam subset. The WTRU may be configured to report a Boolean indication of whether the candidate beams are selected for BDP. For example, the WTRU may indicate 1 if the candidate beam is included in the beam subset reporting and indicate 0 if the candidate beam is not included in the beam subset reporting.

The WTRU may be configured to report one or more aspects associated with beam domain preprocessing. The WTRU may be configured to report information associated with beam subsets. The WTRU may be configured to report preferred values for the beam subset including one or more of the following information for each subset-any combination of the number of beams in the subset, validity time for the beam subset, differential beam step size, beam range, differential beam step threshold, etc. The WTRU may be configured to report the number of preferred beam subsets. The WTRU may report the preferred beam subset reporting periodicity. The WTRU may be configured to determine one or more parameters of preferred beam subset based on preconfigured criteria. For example, the WTRU may be configured to determine the preferred beam subset reporting parameters that minimizes the preprocessing loss. For example, the WTRU may be configured to determine the preferred beam subset reporting parameters that minimizes the CSI reconstruction loss. For example, the WTRU may be configured to determine preferred beam subset reporting parameters that minimize a beam reporting overhead. For example, the WTRU may be configured to determine the preferred beam subset reporting parameters that minimizes the CSI reporting overhead. The WTRU may be configured to determine the preferred beam subset reporting parameters that minimizes the cumulative CSI reporting overhead and beam subset reporting overhead. The WTRU may trigger beam subset reporting when one or more configurations related to CSI-RS transmission is updated. The WTRU may trigger beam subset reporting upon receiving a new CSI report configuration. For example, the WTRU may trigger beam subset reporting upon receiving a new CSI-RS resource configuration. The WTRU may be configured to transmit the preferred beam subset(s) and/or parameters thereof in a RRC message, MAC CE and/or Uplink Control Information (UCI). The WTRU may report the preferred beam subset(s) and/or parameters periodically. The WTRU may report the preferred beam subset(s) and/or parameters when the performance of the current beam subset configuration is below a predefined threshold. The WTRU may report the preferred beam subset(s) and/or parameters when the overhead of the current beam subset configuration is above a preferred beam subset configuration.

The WTRU may be configured to report the beam subset(s) and/or the preferred beam subset(s) and/or parameters thereof on preconfigured resources. The WTRU may be configured to transmit the first beam subset and second beam subset in the same UCI. The WTRU may be configured to transmit the first beam subset and second beam subset in a different UCI. In a solution, the WTRU may be configured to transmit the first beam subset in a MAC CE and second beam subset in a UCI. The WTRU may be configured with physical uplink control channel (PUCCH) resources for transmission of beam set(s) information. For example, the WTRU may transmit the first beam subset in a first set of PUCCH resources and the second beam subset in a second set of PUCCH resources. In a solution, the WTRU may be configured to transmit the beam subset information in physical uplink shared channel (PUSCH). In one or more solutions herein, the WTRU may be configured to trigger scheduling request if the resources for beam subset if not available and/or applicable. For example, the WTRU may not have resources for reporting a beam subset due to collision with high priority UCI. For example, the WTRU may not report the beam subset information if there is mismatch between the beam range/indices preconfigured for reporting and the actual beam range/indices applied for preprocessing.

What is claimed is:

1. A Wireless Transmit/Receive Unit (WTRU) comprising:
   a memory; and
   a processor coupled to the memory, the processor configured to:
   receive configuration information for channel state information (CSI) feedback;
   receive a first CSI reference signal (CSI-RS) transmission;
   receive a second CSI-RS transmission;
   determine, based on the first CSI-RS transmission and the second CSI-RS transmission, a first subset of beams of a plurality of beams and a second subset of beams of the plurality of beams;
   determine, based on the first CSI-RS transmission and the second CSI-RS transmission, a first parameter associated with the first subset of beams and a second parameter associated with the second subset of beams, wherein the first parameter comprises a first validity time, a first beam range, or a first beam step, wherein the second parameter comprises a second validity time, a second beam range, or a second beam step, and wherein the first subset of beams is associated with at least one of: (i) a longer validity time than a validity time of the second subset of beams, (ii) a lower beam range than a beam range of the second subset of beams, or (iii) a smaller beam step than a beam step of the second subset of beams; and
   send one or more reports, wherein the one or more reports comprise an indication of the first subset of beams, an indication of the first parameter associated with the first subset of beams, an indication of the second subset of beams, and an indication of the second parameter associated with the second subset of beams.

2. The WTRU of claim 1, wherein the configuration information comprises one or more of an indication of a number of beam subsets, an indication of a minimum number of beams per subset, an indication of a maximum number of beams per subset, or an indication of a default number of beams per subset.

3. The WTRU of claim 1, wherein the configuration information comprises one or more of an indication of an initial validity time associated with each beam subset, an indication of a minimum validity time associated with each beam subset, or an indication of a maximum validity time associated with each beam subset.

4. The WTRU of claim 1, wherein the configuration information comprises one or more of an indication of a beam range threshold or an indication of a differential beam step threshold.

5. The WTRU of claim 1, wherein the configuration information comprises an indication of a beam subset reporting format.

6. The WTRU of claim 1, wherein the processor is configured to:
   determine CSI measurements based on the first CSI-RS transmission and the second CSI-RS transmission; and
   determine which beam is included in the first subset of beams of the plurality of beams and which beam is included in the second subset of beams of the plurality of beams based on the CSI measurements.

7. The WTRU of claim 1, wherein one or more first reports of the one or more reports comprise the indication of the first parameter associated with the first subset of beams, wherein one or more second reports of the one or more reports comprise the indication of the second parameter associated with the second subset of beams, and wherein a lower number of reporting instances are utilized to send the one or more first reports than a number of reporting instances utilized to send the one or more second reports.

8. The WTRU of claim 1, wherein one or more first reports of the one or more reports comprise information associated with the first subset of beams, and wherein the one or more first reports are sent in response to a determination that transmission performance associated is less than a threshold.

9. The WTRU of claim 1, wherein the processor is configured to:

pre-process a first CSI associated with the first CSI-RS transmission utilizing the first subset of beams and the second subset of beams;

perform CSI compression utilizing a beam domain auto encoder (BDAE) based on the pre-processed first CSI; and send the compressed CSI to a network.

10. The WTRU of claim 1, wherein the validity time indicates how long a beam subset is valid for beam transformation, wherein the beam range indicates a difference between a maximum beam index and a minimum beam index of a beam subset over a time period, and wherein the beam step indicates a maximum difference between beam indices associated with consecutive beam domain reporting instances of a beam subset.

11. A method performed by a Wireless Transmit/Receive Unit (WTRU), the method comprising:

receiving configuration information for channel state information (CSI) feedback;

receiving a first CSI reference signal (CSI-RS) transmission;

receiving a second CSI-RS transmission;

determining, based on the first CSI-RS transmission and the second CSI-RS transmission, a first subset of beams of a plurality of beams and a second subset of beams of the plurality of beams;

determining, based on the first CSI-RS transmission and the second CSI-RS transmission, a first parameter associated with the first subset of beams and a second parameter associated with the second subset of beams, wherein the first parameter comprises a first validity time, a first beam range, or a first beam step, wherein the second parameter comprises a second validity time, a second beam range, or a second beam step, and wherein the first subset of beams is associated with at least one of: (i) a longer validity time than a validity time of the second subset of beams, (ii) a lower beam range than a beam range of the second subset of beams, or (iii) a smaller beam step than a beam step of the second subset of beams; and sending one or more reports, wherein the one or more reports comprise an indication of the first subset of beams, an indication of the first parameter associated with the first subset of beams, an indication of the second subset of beams, and an indication of the second parameter associated with the second subset of beams.

12. The method of claim 11, wherein the configuration information comprises one or more of an indication of a number of beam subsets, an indication of a minimum number of beams per subset, an indication of a maximum number of beams per subset, or an indication of a default number of beams per subset.

13. The method of claim 11, wherein the configuration information comprises one or more of an indication of an initial validity time associated with each beam subset, an indication of a minimum validity time associated with each beam subset, or an indication of a maximum validity time associated with each beam subset.

14. The method of claim 11, wherein the configuration information comprises one or more of an indication of a beam range threshold or an indication of a differential beam step threshold.

15. The method of claim 11, wherein the configuration information comprises an indication of a beam subset reporting format.

16. The method of claim 11, further comprising:

determining CSI measurements based on the first CSI-RS transmission and the second CSI-RS transmission; and determining which beam is included in the first subset of beams of the plurality of beams and which beam is included in the second subset of beams of the plurality of beams based on the CSI measurements.

17. The method of claim 11, wherein one or more first reports of the one or more reports comprise the indication of the first parameter associated with the first subset of beams, wherein one or more second reports of the one or more reports comprise the indication of the second parameter associated with the second subset of beams, and wherein a lower number of reporting instances are utilized to send the one or more first reports than a number of reporting instances utilized to send the one or more second reports.

18. The method of claim 11, wherein one or more first reports of the one or more reports comprise information associated with the first subset of beams, and wherein the one or more first reports are sent in response to a determination that transmission performance is less than a threshold.

19. The method of claim 11, further comprising:

pre-processing a first CSI associated with the first CSI-RS transmission utilizing the first subset of beams and the second subset of beams;

performing CSI compression utilizing a beam domain auto encoder (BDAE) based on the pre-processed first CSI; and sending the compressed CSI to a network.

20. The method of claim 11, wherein the validity time indicates how long a beam subset is valid for beam transformation, wherein the beam range indicates a difference between a maximum beam index and a minimum beam index of a beam subset over a time period, and wherein the beam step indicates a maximum difference between beam indices associated with consecutive beam domain reporting instances of a beam subset.

* * * * *